# United States Patent
Schreder et al.

(10) Patent No.: US 11,958,770 B2
(45) Date of Patent: Apr. 16, 2024

(54) HIGHLY REFRACTIVE GLASS

(71) Applicant: Schott AG, Mainz (DE)

(72) Inventors: Bianca Schreder, Sulzbach (DE); Ute Wölfel, Mainz (DE); Stefanie Hansen, Gensingen (DE)

(73) Assignee: Schott AG, Mainz (DE)

(*) Notice: Subject to any disclaimer, the term of this patent is extended or adjusted under 35 U.S.C. 154(b) by 232 days.

(21) Appl. No.: 17/389,865

(22) Filed: Jul. 30, 2021

(65) Prior Publication Data

US 2022/0033297 A1 Feb. 3, 2022

(51) Int. Cl.
*C03C 3/068* (2006.01)

(52) U.S. Cl.
CPC .................................. *C03C 3/068* (2013.01)

(58) Field of Classification Search
CPC ..................................................... C03C 3/068
See application file for complete search history.

(56) References Cited

U.S. PATENT DOCUMENTS

| | | | | |
|---|---|---|---|---|
| 4,439,531 A * | 3/1984 | Mennemann | ............ | C03C 3/074 501/901 |
| 4,584,279 A * | 4/1986 | Grabowski | ............. | C03C 3/155 501/901 |
| 2004/0235634 A1 * | 11/2004 | Kobayashi | ............. | C03C 3/122 501/41 |
| 2019/0018246 A1 * | 1/2019 | Kogure | ................. | C03C 3/064 |
| 2021/0061703 A1 * | 3/2021 | Shibata | ................... | C03C 3/068 |
| 2022/0315475 A1 * | 10/2022 | Sawasato | ............... | G02B 1/045 |
| 2023/0083714 A1 * | 3/2023 | Konoshita | ................ | G02B 1/00 428/220 |

FOREIGN PATENT DOCUMENTS

| | | | | |
|---|---|---|---|---|
| CN | 111320384 A | | 6/2020 | |
| JP | 2015-20913 A | | 2/2015 | |
| JP | 2019-116408 A | | 7/2019 | |
| JP | 6699809 B1 * | | 5/2020 | ............. C03C 3/064 |
| WO | WO-2021085271 A1 * | | 5/2021 | ............. C03C 3/064 |

OTHER PUBLICATIONS

Technical Information, Optics for Devices, TIE-35: Transmittance of optical glass, Schott North America, Inc., pp. 1-12, Oct. 2005. (Year: 2005).*
Machine translation of Japanese Patent No. 2015-20913, Apr. 12, 2021 (21 pages).
Machine translation of Chinese Patent No. 111320384, Apr. 21, 2021 (19 pages).
Machine translation of Japanese Patent No. 2019-116408 (13 pages).

* cited by examiner

*Primary Examiner* — Elizabeth A. Bolden
(74) *Attorney, Agent, or Firm* — Taylor IP, P.C.

(57) ABSTRACT

A glass includes the following components in % by weight: 2-10 wt-% $SiO_2$, 2-10 wt-% $B_2O_3$, 40-55 wt-% $La_2O_3$, 4-11 wt-% $Gd_2O_3$, 6-14 wt-% $Nb_2O_5$, 8-18.5 wt-% $TiO_2$, and 5-11 wt-% $ZrO_2$. The glass has a refractive index $n_d$ of at least 2.02, a sum of the portions of $La_2O_3$, $Nb_2O_5$, $TiO_2$ and $ZrO_2$ is at least 76.5% by weight, and a weight ratio of a sum of the portions of $La_2O_3$, $Nb_2O_5$ and $ZrO_2$ to the portion of $TiO_2$ is at least 3.85:1.

20 Claims, No Drawings

HIGHLY REFRACTIVE GLASS

CROSS REFERENCE TO RELATED APPLICATIONS

This application claims priority to German Patent Application No. DE 10 2020 120 171.0 filed on Jul. 30, 2020, which is incorporated in its entirety herein by reference.

BACKGROUND OF THE INVENTION

1. Field of the Invention

The present invention relates to glasses with high refractive index, in particular a refractive index of higher than 2.00 in the whole visible range of the spectrum and/or a refractive index $n_d$ of at least 2.02. The glasses may have a high transmittance in the visible wavelength range, in particular also in the lower visible wavelength range. The invention also relates to a method for the production of the glasses as well as the use of the glasses. The glasses provided according to the present invention can in particular be used for AR eyeglasses. Further uses are, for example, uses as lens or wave guide in the optical field.

2. Description of the Related Art

The field of the so-called augmented reality (AR) has become increasingly important. This is understood as the widening of reality, in particular by visually presented computer-generated information. For this purpose, often particular eyeglasses, so-called AR eyeglasses, are used. For the production of such eyeglasses, glasses with particularly high refractive index are required, because they increase the field of view (FoV). In addition, preferably, the glasses should have a particularly good transmittance in the visible wavelength range. In this connection, in the case of particularly highly refractive glasses, in particular the transmittance in the lower visible wavelength range, for example in the blue range of 420 nm to 490 nm, inter alia at 420 nm or 460 nm, has shown to be problematic. In this connection, this phenomenon is also described by the term "UV edge" of the glass. When the UV edge is shifted too far into the visible range or does not rise steeply enough, then the transmittance properties in the lower visible wavelength range are not good. In addition, it has been shown to be difficult to provide glasses with a particularly high refractive index in the whole visible range (in particular from 380 nm to 750 nm). So, for example, glasses which have a refractive index $n_d$ of 2.001, but at other wavelengths in the visible range do not achieve a refractive index of at least 2.000 are known.

In the past, in particular, glasses made of the niobium phosphate system have been used. However, in the production, these glasses are very problematic, because loss of oxygen, especially due to high melting and refining temperatures, in the already reducing phosphate system results in lower oxidation states of Nb than V and thus in an intensive brown up to even black coloration. Furthermore, this glass family does not only tend to interfacial crystallization, like the lanthanum borates or borosilicate systems, but also exhibits a very fast crystal growth, which makes aftercooling (stress cooling or refractive power adjustment) critical for optionally pre-nucleated glasses. In addition, the glass is relatively brittle and therefore it is difficult to polish it into thin wafers.

What is needed in the art is glasses having a refractive index of higher than 2.0 in the whole visible range of the spectrum and/or a refractive index $n_d$ of at least 2.02. The glasses may be characterized by excellent transmittance properties, in particular also in the lower visible wavelength range, for example at 420 nm and/or 460 nm. In addition, the batch costs shall remain moderate. The glass should be characterized by a good potential for being manufactured without streaks. In addition, it should be possible to produce wafers out of the glass in good yield. In particular, good hot glass forming and good processing of the glass should be possible. The glasses should have a density which is as low as possible, despite the high refractive index. So, in particular, the wearing comfort of the AR eyeglasses can be increased.

SUMMARY OF THE INVENTION

In some exemplary embodiments provided according to the present invention, a glass includes the following components in % by weight: 2-10 wt-% $SiO_2$, 2-10 wt-% $B_2O_3$, 40-55 wt-% $La_2O_3$, 4-11 wt-% $Gd_2O_3$, 6-14 wt-% $Nb_2O_5$, 8-18.5 wt-% $TiO_2$, and 5-11 wt-% $ZrO_2$. The glass has a refractive index $n_d$ of at least 2.02, a sum of the portions of $La_2O_3$, $Nb_2O_5$, $TiO_2$ and $ZrO_2$ is at least 76.5% by weight, and a weight ratio of a sum of the portions of $La_2O_3$, $Nb_2O_5$ and $ZrO_2$ to the portion of $TiO_2$ is at least 3.85:1.

In some exemplary embodiments provided according to the present invention, a glass has a refractive index $n_d$ of at least 2.02 and an internal transmission TI of at least 85%, measured at a wavelength of 460 nm and a sample thickness of 10 mm.

In some exemplary embodiments provided according to the present invention, a glass article includes a glass having a refractive index $n_d$ of at least 2.02 and being in the form of at least one of: a glass for eyeglasses; a stack of wafers; a wafer; a wafer with a maximum diameter of 5.0 cm to 40.0 cm; a lens; a spherical lens; a prism; an asphere; a light wave guide; a fiber; or a plate. The glass has an internal transmission TI of at least 85%, measured at a wavelength of 460 nm and a sample thickness of 10 mm.

DETAILED DESCRIPTION OF THE INVENTION

In some exemplary embodiments provided according to the present invention, a glass is provided that comprises the following components in % by weight:

| Component | Portion (% by weight) |
| --- | --- |
| $SiO_2$ | 2-10 |
| $B_2O_3$ | 2-10 |
| $La_2O_3$ | 40-55 |
| $Gd_2O_3$ | 4-11 |
| $Nb_2O_5$ | 6-14 |
| $TiO_2$ | 8-18.5 |
| $ZrO_2$ | 5-11 | the glass having a refractive index $n_d$ of at least 2.02. The sum of the portions of $La_2O_3$, $Nb_2O_5$, $TiO_2$ and $ZrO_2$ is at least 76.5% by weight, and the weight ratio of the sum of the portions of $La_2O_3$, $Nb_2O_5$ and $ZrO_2$ to the portion of $TiO_2$ is at least 3.85:1.

In some exemplary embodiments provided according to the present invention, a glass is provided that comprises the following components in % by weight:

| Component | Portion (% by weight) |
|---|---|
| $SiO_2$ | 2-10 |
| $B_2O_3$ | 2-10 |
| $La_2O_3$ | 40-55 |
| $Gd_2O_3$ | 4-11 |
| $Nb_2O_5$ | 6-14 |
| $TiO_2$ | 8-18.5 |
| $ZrO_2$ | 5-11 | the glass having a refractive index $n_d$ of at least 2.03. The sum of the portions of $La_2O_3$, $Nb_2O_5$, $TiO_2$ and $ZrO_2$ is at least 76.5% by weight, the weight ratio of the sum of the portions of $La_2O_3$, $Nb_2O_5$ and $ZrO_2$ to the portion of $TiO_2$ is at least 3.85:1, and the internal transmission TI of the glass, measured at a wavelength of 460 nm and a sample thickness of 10 mm, is at least 84% or at least 85%.

In some embodiments, the glass comprises the following components in % by weight:

| Component | Portion (% by weight) |
|---|---|
| $SiO_2$ | 4-9 |
| $B_2O_3$ | 4-8 |
| $La_2O_3$ | 44-50 |
| $Gd_2O_3$ | 4.5-9 |
| $Nb_2O_5$ | 8-12 |
| $TiO_2$ | 9-17 |
| $ZrO_2$ | 6-8 |

In some embodiments, the glass comprises the following components in % by weight:

| Component | Portion (% by weight) |
|---|---|
| $SiO_2$ | 2-10 |
| $B_2O_3$ | 2-10 |
| $La_2O_3$ | 40-55 |
| $Gd_2O_3$ | 4.5-9 |
| $Nb_2O_5$ | 6-14 |
| $TiO_2$ | 8-18.5 |
| $ZrO_2$ | 6-11 |

In some embodiments, the glass comprises the following components in % by weight:

| Component | Portion (% by weight) |
|---|---|
| $SiO_2$ | 2-10 |
| $B_2O_3$ | 2-10 |
| $La_2O_3$ | 40-55 |
| $Gd_2O_3$ | 4-9 |
| $Nb_2O_5$ | 6-14 |
| $TiO_2$ | 8-18.5 |
| $ZrO_2$ | 6-11 |

In some embodiments, the glass comprises the following components in % by weight:

| Component | Portion (% by weight) |
|---|---|
| $SiO_2$ | 2-10 |
| $B_2O_3$ | 2-10 |
| $La_2O_3$ | 40-55 |
| $Gd_2O_3$ | 4-11 |
| $Nb_2O_5$ | 6-14 |
| $TiO_2$ | 8-18.5 |
| $ZrO_2$ | 5-11 |
| BaO | 1-8 |

In some embodiments, the glass comprises the following components in % by weight:

| Component | Portion (% by weight) |
|---|---|
| $SiO_2$ | 2-10 |
| $B_2O_3$ | 2-10 |
| $La_2O_3$ | 40-55 |
| $Gd_2O_3$ | 4-11 |
| $Nb_2O_5$ | 6-14 |
| $TiO_2$ | 8-18.5 |
| $ZrO_2$ | 5-11 |
| BaO | 2-6 |

In some embodiments, the glass comprises the following components in % by weight:

| Component | Portion (% by weight) |
|---|---|
| $SiO_2$ | 2-10 |
| $B_2O_3$ | 2-10 |
| $La_2O_3$ | 40-55 |
| $Gd_2O_3$ | 4-11 |
| $Nb_2O_5$ | 6-14 |
| $TiO_2$ | 8-18.5 |
| $ZrO_2$ | 5-11 |
| BaO | 3-5 |

In some exemplary embodiments provided according to the present invention, a glass is provided with a refractive index $n_d$ in a range of 2.02 to 2.08, such as of 2.03 to 2.07 or of 2.04 to 2.06 and an internal transmission TI of at least 85%, such as at least 90%, at least 91%, at least 92%, at least 93%, at least 94%, at least 95%, at least 96%, or at least 97%, the internal transmission being measured at a wavelength of 460 nm and a sample thickness of 10 mm.

In some exemplary embodiments provided according to the present invention, a glass is provided with a refractive index $n_d$ of at least 2.02, at least 2.03, or at least 2.04, and an internal transmission TI of at least 85%, such as at least 90%, at least 91%, at least 92%, at least 93%, at least 94%, at least 95%, at least 96%, or at least 97%, the internal transmission being measured at a wavelength of 460 nm and a sample thickness of 10 mm.

The internal transmission and the internal transmission factor, respectively, can be measured with methods which are known by a person skilled in the art, for example, according to DIN 5036-1:1978. In this description, the data given in connection with the internal transmission relate to a sample thickness of 10 mm. The mention of a "sample thickness" does not mean that the glass has this thickness, but it does only mean that the data given in connection with the internal transmission relate to this thickness.

Unless otherwise stated or obvious for a person skilled in the art, here described measurements are conducted at 20° C. and 101.3 kPa air pressure.

The glass provided according to the invention has a refractive index $n_d$ of at least 2.02. In some embodiments, the refractive index $n_d$ is in a range of 2.02 to 2.08, such as of 2.03 to 2.07 or of 2.04 to 2.06. The refractive index $n_d$ is known to a person skilled in the art, and it is, in particular, the refractive index at a wavelength of about 587.6 nm (wavelength of the d line of helium). A person skilled in the art knows how the refractive index $n_d$ can be determined. The glass provided according to the invention may, for example, have a refractive index $n_d$ of at least 2.02, at least 2.03, or at least 2.04. The glass provided according to the invention may, for example, have a refractive index $n_d$ of at most 2.08, at most 2.07, or at most 2.06.

In some embodiments, the refractive index is determined with the help of a refractometer, in particular with the help of a V block refractometer. Here, in particular, samples having a square or nearly square base (e.g., with dimensions of about 20 mm×20 mm×5 mm) can be used. When a measurement with a V block refractometer is conducted, then the samples normally are placed in a V-shaped block prism with known refractive index. The refraction of an incident light beam depends on the difference between the refractive index of the sample and the refractive index of the V block prism so that it is possible to determine the refractive index of the sample. The measurement may be conducted at a temperature of 22° C.

The refractive index depends on the wavelength of the light and can be determined at different wavelengths, for example $n_d$ at about 587.6 nm, nF at about 486 nm and nC at about 656 nm. In some embodiments, the glass has in the whole visible range of the spectrum (in particular of 380 nm to 750 nm) a refractive index of higher than 2.00, such as of higher than 2.01. In some embodiments, the refractive index of the glass in the whole visible range of the spectrum is in a range of 2.00 to 2.10, for example of 2.01 to 2.09, of 2.02 to 2.08, of 2.03 to 2.07, or of 2.04 to 2.06. The refractive index of the glass in the whole visible range of the spectrum may, for example, be at least 2.00, at least 2.01, at least 2.02, at least 2.03, or at least 2.04. The refractive index of the glass in the whole visible range of the spectrum may, for example, be at most 2.10, at most 2.09, at most 2.08, at most 2.07, or at most 2.06.

The refractive index nF is the refractive index at a wavelength of about 486 nm. The refractive index nF of the glasses provided according to the present invention may be in a range of 2.00 to 2.10, for example of 2.01 to 2.09, of 2.02 to 2.08, of 2.03 to 2.07, or of 2.04 to 2.06. The refractive index nF may, for example, be at least 2.00, at least 2.01, at least 2.02, at least 2.03 or at least 2.04. The refractive index nF may, for example, be at most 2.10, at most 2.09, at most 2.08, at most 2.07, or at most 2.06.

The refractive index nC is the refractive index at a wavelength of about 656 nm. The refractive index nC of the glasses provided according to the present invention may be in a range of 2.00 to 2.06, for example of 2.01 to 2.05, or of 2.02 to 2.04. The refractive index nC may, for example, be at least 2.00, at least 2.01, or at least 2.02. The refractive index nC may, for example, be at most 2.06, at most 2.05, or at most 2.04.

In some embodiments, the glass has a dispersion $v_d$ of 20.0 to 35.0, for example of 22.5 to 32.5 or of 25.0 to 30.0. The dispersion $v_d$ may, for example, be at least 20.0, at least 22.5, or at least 25.0. The dispersion $v_d$ may, for example, be at most 35.0, at most 32.5, or at most 30.0.

The density of the glasses provided according to the present invention may be in a range of 4.90 g/cm³ to 5.50 g/cm³, such as of 4.95 g/cm³ to 5.40 g/cm³, or of 5.00 g/cm³ to 5.35 g/cm³. The density may, for example, be at least 4.90 g/cm³, at least 4.95 g/cm³, or at least 5.00 g/cm³. The density may, for example, be at most 5.50 g/cm³, at most 5.40 g/cm³, or at most 5.35 g/cm³. In some embodiments, the density of the glasses is lower than 5.30 g/cm³, such as lower than 5.25 g/cm³, lower than 5.20 g/cm³, or lower than 5.15 g/cm³.

It is known that the density of glasses increases with increasing refractive index. In some embodiments, however, the glasses provided according to the present invention are in particular also characterized by the fact that the density, despite the high refractive index, is relatively low. The ratio of density to the refractive index $n_d$ may be in a range of 2.30 to 2.80 g/cm³, such as of 2.35 to 2.75 g/cm³, of 2.40 to 2.70 g/cm³, of 2.45 to 2.65 g/cm³, or of 2.50 to 2.60 g/cm³. The ratio of density and refractive index $n_d$ is determined by dividing the value of the density (in g/cm³) by the value of the refractive index $n_d$. In some embodiments, the ratio of density to the refractive index $n_d$ is lower than 2.80 g/cm³, such as lower than 2.75 g/cm³, lower than 2.70 g/cm³, lower than 2.65 g/cm³, lower than 2.60 g/cm³, or lower than 2.55 g/cm³.

In some embodiments, the glass provided according to the present invention has a high transmittance in the visible range, in particular also in the lower visible wavelength range, for example at 420 nm and/or 460 nm. Thus, in some embodiments, the UV edge can be found at relatively low wavelengths, despite the highly refractive properties.

In some embodiments, the internal transmission TI of the glass, measured at a wavelength of 420 nm and a sample thickness of 10 mm, is at least 25%, such as at least 30%, at least 40%, at least 50%, at least 60%, at least 70%, at least 75%, at least 80%, at least 85%, at least 87.5%, or at least 90%. In some embodiments, the internal transmission TI of the glass, measured at a wavelength of 420 nm and a sample thickness of 10 mm, is at most 99%, at most 98%, at most 95%, or at most 92.5%.

In some embodiments, the internal transmission TI of the glass, measured at a wavelength of 460 nm and a sample thickness of 10 mm, is at least 63%, such as at least 65%, at least 70%, at least 75%, at least 80%, at least 85%, at least 87.5%, at least 90%, at least 91%, at least 92%, at least 93%, at least 94%, at least 95%, at least 96%, or at least 97%. In some embodiments, the internal transmission TI of the glass, measured at a wavelength of 460 nm and a sample thickness of 10 mm, is at most 99.99%, at most 99.9%, at most 99%, or at most 98%.

When $T_g$ is very high, then the aftercooling lasts longer. However, $T_g$ is also a measure for the chemical stability and hardness (the higher $T_g$, the more stable the network and thus harder and chemically more resistant the glass). While a high chemical resistance is good, a hardness which is too high is also expensive again, because the grinding and polishing last longer and have to be conducted with higher carefulness, so that during it not too many microcracks are generated. Therefore, in some embodiments, the glass transition temperature $T_g$ of the glass provided according to the present invention is in a range of 700° C. to 800° C., such as of 710° C. to 780° C., of 720° C. to 760° C., or of 730° C. to 750° C. The glass transition temperature $T_g$ may, for example, be at least 700° C., at least 710° C., at least 720° C., or at least 730° C. The glass transition temperature $T_g$ may, for example, be at most 800° C., at most 780° C., at most 760° C., or at most 750° C.

The temperature T1 at which the viscosity is $10^1$ dPas may be in a range of 1100° C. to 1250° C., such as in a range of 1150° C. to 1200° C. Thus, the glass composition provided according to the present invention allows particularly low meltdown temperatures. The temperature T1 may, for example, be at least 1100° C. or at least 1150° C. The temperature T1 may, for example, be at most 1250° C. or at most 1200° C.

The temperature T4 at which the viscosity is $10^4$ dPas may be in a range of 875° C. to 1025° C., such as in a range of 925° C. to 975° C. The temperature T4 may, for example, be at least 875° C. or at least 925° C. The temperature T4 may, for example, be at most 1025° C. or at most 975° C.

The softening temperature T7.6 at which the viscosity is $10^{7.6}$ dPas may be in a range of 750° C. to 900° C., of 800° C. to 850° C. The softening temperature T7.6 may, for example, be at least 750° C. or at least 800° C. The softening temperature T7.6 may, for example, be at most 900° C. or at most 850° C.

The crystallization temperature TK may be in a range of 1000° C. to 1200° C., such as of 1025° C. to 1175° C. or of 1050° C. to 1150° C. The viscosity at TK may be in a range of 10 to 100 dPas. The crystallization temperature TK may, for example, be at least 1000° C., at least 1025° C., or at least 1050° C. The crystallization temperature TK may, for example, be at most 1200° C., at most 1175° C., or at most 1150° C.

The viscosity of a glass can be determined with the help of a rotational viscometer, e.g., according to DIN ISO 7884-2:1998-2. The dependence of the viscosity on the temperature can be determined by using the VFT curve (Vogel-Fulcher-Tammann equation). The softening temperature can be determined with the help of the fiber elongation viscometer according to ISO 7884-2.

In some embodiments, the glasses provided according to the invention have a coefficient of thermal expansion (CTE) in the temperature range of 20° C. to 300° C. (CTE(20,300)) which is in a range of 6.7 to 10.0 ppm/K, such as of 7.0 to 9.7 ppm/K, of 7.3 to 9.4 ppm/K, of 7.6 to 9.1 ppm/K, of 7.9 to 8.8 ppm/K, of 8.0 to 8.7 ppm/K, or of 8.1 to 8.6 ppm/K. The CTE should be well in line with coatings, wherein in particular very high CTE values often result in problems, because in this range the polymer often is not characterized by a linear CTE profile, but by a steeper one. When then the glass, in addition, has an unsuitable CTE, then it may be that cracks are formed or layers are peeled off. For these reasons, inter alia, the above-mentioned CTE values may be advantageous. The CTE may, for example, be at least 6.7 ppm/K, at least 7.0 ppm/K, at least 7.3 ppm/K, at least 7.6 ppm/K, at least 7.9 ppm/K, at least 8.0 ppm/K, or at least 8.1 ppm/K. The CTE may, for example, be at most 10.0 ppm/K, at most 9.7 ppm/K, at most 9.4 ppm/K, at most 9.1 ppm/K, at most 8.8 ppm/K, at most 8.7 ppm/K, or at most 8.6 ppm/K.

The glass provided according to the present invention contains $SiO_2$ in a portion of 2 to 10% by weight, such as 4 to 9% by weight. $SiO_2$ is a glass former. The oxide very strongly improves the chemical resistance, but also increases the processing temperatures. When it is used in very high amounts, then the refractive indices according to the present invention cannot be achieved. In some embodiments, the portion of $SiO_2$ is in a range of 4.5 to 7% by weight, of 4.75 to 6.5% by weight, or of 5 to 6% by weight. The portion of $SiO_2$ may, for example, be at least 2% by weight, at least 4% by weight, at least 4.5% by weight, at least 4.75% by weight, or at least 5% by weight. The portion of $SiO_2$ may, for example, be at most 10% by weight, at most 9% by weight, at most 7% by weight, at most 6.5% by weight, or at most 6% by weight.

$B_2O_3$ has been shown to be particularly suitable for achieving low meltdown temperatures. But, in particular due to its corrosiveness with respect to melting tank materials, the content of $B_2O_3$ is limited. The glass provided according to the present invention contains $B_2O_3$ in a portion of 2 to 10% by weight, such as of 3 to 9% by weight, of 4 to 8.5% by weight, 5 to 8% by weight, or 5.25 to 6.5% by weight. The portion of $B_2O_3$ may, for example, be at least 2% by weight, at least 3% by weight, at least 4% by weight, at least 5% by weight, or at least 5.25% by weight. The portion of $B_2O_3$ may, for example, be at most 10% by weight, at most 9% by weight, at most 8.5% by weight, at most 8% by weight, or at most 6.5% by weight.

When the sum of the weight portions of $SiO_2$ and $B_2O_3$ is very high, then this negatively influences the refractive index. On the other hand, $SiO_2$ and $B_2O_3$ are required as network formers so that the portion should also not be very low. The sum of the weight portions of $SiO_2$ and $B_2O_3$ may be 6 to 16% by weight, such as 7 to 15% by weight, 8 to 14% by weight, or 9 to 13% by weight. The sum of the weight portions of $SiO_2$ and $B_2O_3$ may, for example, be at least 6% by weight, at least 7% by weight, at least 8% by weight, or at least 9% by weight. The sum of the weight portions of $SiO_2$ and $B_2O_3$ may, for example, be at most 16% by weight, at most 15% by weight, at most 14% by weight, or at most 13% by weight.

In some embodiments, the weight portion of $SiO_2$ is higher than the weight portion of $B_2O_3$, because $SiO_2$ does not attack the refractory material, in contrast to $B_2O_3$. But, $B_2O_3$ is more advantageous for the melting down behavior. Therefore, in some embodiments, $SiO_2$ and $B_2O_3$ are present in comparable portions. The weight ratio of the portion of $SiO_2$ to the portion of $B_2O_3$ may be in a range of 0.45:1 to 1.45:1, of 0.55:1 to 1.35:1, of 0.65:1 to 1.25:1. In some embodiments, the portion of $B_2O_3$ is at least as high as the portion of $SiO_2$. The weight ratio of the portion of $SiO_2$ to the portion of $B_2O_3$ can advantageously be used for suitably adjusting meltdown temperature and corrosiveness of the melt. The weight ratio of the portion of $SiO_2$ to the portion of $B_2O_3$ may, for example, be at least 0.45:1, at least 0.55:1, or at least 0.65:1. The weight ratio of the portion of $SiO_2$ to the portion of $B_2O_3$ may, for example, be at most 1.45:1, at most 1.35:1, or at most 1.25:1. In some embodiments, the weight ratio of the portion of $SiO_2$ to the portion of $B_2O_3$ is at least 1:1 or higher than 1:1, for example at least 1.01:1, at least 1.02:1, at least 1.03:1, or at least 1.04:1.

The sum of the portions of $La_2O_3$, $Nb_2O_5$, $TiO_2$ and $ZrO_2$ in the glass provided according to the present invention is at least 76.5% by weight. In some embodiments, the sum of the portions of $La_2O_3$, $Nb_2O_5$, $TiO_2$ and $ZrO_2$ is in a range of 76.5% by weight to 85% by weight, such as of 77% by weight to 84% by weight, of 78% by weight to 83% by weight, or of 79% by weight to 82.5% by weight. In some embodiments, the sum of the portions of $La_2O_3$, $Nb_2O_5$, $TiO_2$ and $ZrO_2$ in the glass provided according to the present invention is even at least 80% by weight. A high portion of these components is advantageous for achieving a particularly high refractive index. But it is also possible that the tendency to crystallization increases so that it may be advantageous to limit the content. The sum of the portions of $La_2O_3$, $Nb_2O_5$, $TiO_2$ and $ZrO_2$ may, for example, be at least 76.5% by weight, at least 77% by weight, at least 78% by weight, or at least 79% by weight. The sum of the portions of $La_2O_3$, $Nb_2O_5$, $TiO_2$ and $ZrO_2$ may, for example, be at most 85% by weight, at most 84% by weight, at most 83% by weight, or at most 82.5% by weight.

The weight ratio of the sum of the portions of $La_2O_3$, $Nb_2O_5$, $TiO_2$ and $ZrO_2$ to the sum of the portions of $SiO_2$ and $B_2O_3$ may be in a range of 6.25:1 to 8.35:1, such as of 6.75:1 to 7.85:1, of 6.95:1 to 7.65:1, of 7.05:1 to 7.55:1, or of 7.15:1 to 7.45:1. The weight ratio of the sum of the portions of $La_2O_3$, $Nb_2O_5$, $TiO_2$ and $ZrO_2$ to the sum of the portions of $SiO_2$ and $B_2O_3$ may, for example, be at least 6.25:1, at least 6.75:1, at least 6.95:1, at least 7.05:1, or at least 7.15:1. The weight ratio of the sum of the portions of $La_2O_3$, $Nb_2O_5$, $TiO_2$ and $ZrO_2$ to the sum of the portions of $SiO_2$ and $B_2O_3$ may, for example, be at most 8.35:1, at most 7.85:1, at most 7.65:1, at most 7.55:1, or at most 7.45:1.

$La_2O_3$ with a portion of 40 to 55% by weight is one of the main components of the glass provided according to the present invention. $La_2O_3$, together with $SiO_2$ and $B_2O_3$, forms the dense glass network into which $TiO_2$ is inserted. $La_2O_3$ is stable and not redox sensitive as well as also with respect to price and availability more favorable than $Gd_2O_3$ and $Nb_2O_5$. In some embodiments, the portion of $La_2O_3$ is in a range of 44 to 50% by weight, such as of 45 to 49% by weight. When the portion of $La_2O_3$ to the disadvantage of other highly refractive components is increased, then this results in a negative influence onto the refractive index. In addition, in the case of very high portions of $La_2O_3$ also the tendency to crystallization increases. The portion of $La_2O_3$ may, for example, be at least 40% by weight, at least 44% by weight, or at least 45% by weight. The portion of $La_2O_3$ may, for example, be at most 55% by weight, at most 50% by weight, or at most 49% by weight.

In some embodiments, the glasses provided according to the present invention have a weight ratio of the sum of the portions of $SiO_2$ and $B_2O_3$ to the portion of $La_2O_3$ in a range of 0.10:1 to 0.40:1, such as of 0.15:1 to 0.35:1, of 0.16:1 to 0.32:1, of 0.18:1 to 0.28:1, of 0.20:1 to 0.26:1, or of 0.21:1 to 0.25:1. The weight ratio of the sum of the portions of $SiO_2$ and $B_2O_3$ to the portion of $La_2O_3$ may, for example, be at least 0.10:1, at least 0.15:1, at least 0.16:1, at least 0.18:1, at least 0.20:1, or at least 0.21:1. The weight ratio of the sum of the portions of $SiO_2$ and $B_2O_3$ to the portion of $La_2O_3$ may, for example, be at most 0.40:1, at most 0.35:1, at most 0.32:1, at most 0.28:1, at most 0.26:1, or at most 0.25:1.

In addition to its high influence onto the refractive index, $Nb_2O_5$ also has a positive influence onto the glass density. With this component the densities can be reduced. But it can exhibit a tendency to loss of oxygen and formation of lower oxidation states and thus to a more intensive coloration. The glasses provided according to the present invention contain $Nb_2O_5$ in a portion of 6 to 14% by weight, such as 8 to 12% by weigh or 10 to 12% by weight. The portion of $Nb_2O_5$ may, for example, be at least 6% by weight, at least 8% by weight, or at least 10% by weight. The portion of $Nb_2O_5$ may, for example, be at most 14% by weight, at most 13% by weight, or at most 12% by weight.

The sum of the portions of $La_2O_3$ and $Nb_2O_5$ may be in a range of 48 to 67% by weight, such as of 50 to 65% by weight, of 52.5 to 62.5% by weight, or of 55 to 60% by weight. In some embodiments, the sum of the portions of $La_2O_3$ and $Nb_2O_5$ is at least 48% by weight, such as at least 50% by weight, at least 52.5% by weight, at least 55% by weight, or at least 57.5% by weight. The sum of the portions of $La_2O_3$ and $Nb_2O_5$ may, for example, be at most 67% by weight, at most 65% by weight, at most 62.5% by weight, or at most 60% by weight.

The glasses provided according to the present invention contain $TiO_2$ in a portion of 8 to 18.5% by weight, such as 9 to 18% by weight, 12 to 17% by weight, or 14.5 to 16.5% by weight. $TiO_2$ makes a notable contribution to a high refractive index, and it also helps to maintain the density relatively low. But a limitation of the portion of $TiO_2$ is advantageous, because as nucleating agent it may make a contribution to crystal growth so that hot post-processing, for example pressing, is complicated. In some embodiments, the portion of $TiO_2$ is at most 18.5% by weight, at most 18% by weight, at most 17% by weight, or at most 16.5% by weight. The portion of $TiO_2$ may, for example, be at least 8% by weight, at least 9% by weight, at least 12% by weight, or at least 14.5% by weight.

In contrast to $TiO_2$, $ZrO_2$ does not exhibit any tendency to the formation of lower colored oxidation states. But, both, its solubility and also the velocity with which $ZrO_2$ is dissolved are limited. Higher portions of $ZrO_2$ are unfavorable, because for complete dissolution higher temperatures are required which in turn has a negative influence onto the transmittance. In addition, the purity of $ZrO_2$ is not very high (in particular impurities with Fe). Therefore, at the upper end, the content of $ZrO_2$ is limited. The portion of $ZrO_2$ in the glasses provided according to the preset invention is 5 to 11% by weight, such as 6 to 8% by weight or 6.25 to 7.5% by weight. A limitation of the portion of $ZrO_2$ is also advantageous for confining potential crystal growth. In some embodiments, the portion of $ZrO_2$ is at least 5% by weight, at least 5.5% by weight, at least 6% by weight, at least 6.25% by weight, or at least 6.5% by weight. The portion of $ZrO_2$ may, for example, be at most 11% by weight, at most 8% by weight, at most 7.5% by weight, at most 7% by weight, or at most 6.75% by weight.

$TiO_2$ and $ZrO_2$ make a notable contribution to a high refractive index, wherein in particular $TiO_2$ also makes a contribution to a relatively low density. But, on the other hand, the portions of $TiO_2$ and $ZrO_2$ should also not be too high, in particular in view of solubility, nucleation and crystallization. The sum of the portions of $TiO_2$ and $ZrO_2$ may be in a range of 15 to 30% by weight, such as of 17.5 to 27.5% by weight or of 20 to 25% by weight. In some embodiments, the sum of the portions of $TiO_2$ and $ZrO_2$ is at least 15% by weight, such as at least 17.5% by weight, at least 20% by weight, at least 21% by weight, at least 22% by weight, or even at least 22.7% by weight. The sum of the portions of $TiO_2$ and $ZrO_2$ may, for example, be at most 30% by weight, at most 27.5% by weight, or at most 25% by weight.

The possible portion of $TiO_2$ in the glass is limited due to the tendency to crystallization. In addition, $TiO_2$ also absorbs in the blue wavelength range, even as Ti(IV), while Nb(V) absorbs in the UV. But, reduced $Nb_2O_5$ causes considerably more absorption in the visible range than reduced $TiO_2$. In contrast thereto, $La_2O_3$ is stable and not redox sensitive. According to this, it is advantageous, on the one hand, to limit the portion of $TiO_2$ at the upper end, so that the UV absorption of the glass in the case of completely oxidized components is not shifted too far into the visible range, but, on the other hand, to use the high $n_d$ contribution and the low density contribution of $TiO_2$. $La_2O_3$ and $Nb_2O_5$ also make a contribution to a high refractive index, they stabilize the network and maintain—as long as they remain oxidized—the UV transmittance in a higher range. According to this, it has been shown to be advantageous to adjust the weight ratio of the sum of the portions of $ZrO_2$, $La_2O_3$ and $Nb_2O_5$ to the portion of $TiO_2$ in a targeted manner, in particular to limit it at the lower end. The glasses provided according to the present invention have a weight ratio of the sum of the portions of $La_2O_3$, $Nb_2O_5$ and $ZrO_2$ to the portion of $TiO_2$ of at least 3.85:1. In some embodiments, the weight ratio of the sum of the portions of $La_2O_3$, $Nb_2O_5$ and $ZrO_2$ to the portion of $TiO_2$ is in a range of 3.85:1 to 5.25:1, such as of 3.90:1 to 5.00:1, of 3.95:1 to 4.75:1, for example 3.96:1 to 4.50:1, 3.97:1 to 4.40:1, 3.98:1 to 4.35:1 or 3.99:1 to 4.30:1. In some embodiments, the weight ratio of the sum of the portions of $La_2O_3$, $Nb_2O_5$ and $ZrO_2$ to the portion of $TiO_2$ is at least 3.85:1, at least 3.90:1, at least 3.95:1, at least 3.96:1, at least 3.97:1, at least 3.98:1, at least 3.99:1, or at least 4.00:1. The weight ratio of the sum of the portions of $La_2O_3$, $Nb_2O_5$ and $ZrO_2$ to the portion of $TiO_2$ may, for example, be at most 5.25:1, at most 5.00:1, at most 4.75:1, at most 4.50:1, at most 4.40:1, at most 4.35:1, at most 4.30:1, at most 4.25:1, at most 4.20:1, or at most 4.15:1.

In some embodiments, the weight ratio of the sum of the portions of $La_2O_3$ and $Nb_2O_5$ to the portion of $TiO_2$ is at least 3.15:1, such as at least 3.25:1, at least 3.35:1, at least 3.46:1, at least 3.50:1, at least 3.56:1, or at least 3.60:1. In some embodiments, the weight ratio of the sum of the portions of $La_2O_3$ and $Nb_2O_5$ to the portion of $TiO_2$ is in a range of 3.15:1 to 4.25:1, such as of 3.25:1 to 4.15:1, of 3.35:1 to 4.05:1, of 3.46:1 to 3.94:1, of 3.50:1 to 3.90:1, of 3.56:1 to 3.84:1, or of 3.60:1 to 3.80:1. The weight ratio of the sum of the portions of $La_2O_3$ and $Nb_2O_5$ to the portion of $TiO_2$ may, for example, be at most 4.25:1, at most 4.15:1, at most 4.05:1, at most 3.94:1, at most 3.90:1, at most 3.84:1, or at most 3.80:1.

From the previously described considerations with respect to color, $n_d$ contribution, density contribution and crystallization, it follows that it is also advantageous to adjust the ratio of the portions of $TiO_2$ and $Nb_2O_5$ in a targeted manner. So, it is possible, in particular, to choose the composition so stable that only via increasing/decreasing of $SiO_2$ the range of the refractive power can variably be adjusted. The weight ratio of the portion of $TiO_2$ to the portion of $Nb_2O_5$ may be in a range of 1.05:1 to 1.75:1, such as of 1.15:1 to 1.65:1, or of 1.25:1 to 1.55:1. The weight ratio of the portion of $TiO_2$ to the portion of $Nb_2O_5$ may, for example, be at least 1.05:1, at least 1.15:1, or at least 1.25:1. The weight ratio of the portion of $TiO_2$ to the portion of $Nb_2O_5$ may, for example, be at most 1.75:1, at most 1.65:1, or at most 1.55:1.

In some embodiments, the weight ratio of the sum of the portions of $La_2O_3$ and $Nb_2O_5$ to the sum of the portions of $TiO_2$ and $ZrO_2$ is in a range of 2.15:1 to 3.05:1, such as of 2.25:1 to 2.95:1, of 2.35:1 to 2.85, of 2.45:1 to 2.75:1, or of 2.55:1 to 2.65:1. In some embodiments, the weight ratio of the sum of the portions of $La_2O_3$ and $Nb_2O_5$ to the sum of the portions of $TiO_2$ and $ZrO_2$ is at least 2.15:1, such as at least 2.25:1, at least 2.35:1, at least 2.45:1, at least 2.53:1, or at least 2.55:1. The weight ratio of the sum of the portions of $La_2O_3$ and $Nb_2O_5$ to the sum of the portions of $TiO_2$ and $ZrO_2$ may, for example, be at most 3.05:1, at most 2.95:1, at most 2.85:1, at most 2.75:1, or at most 2.65:1.

The sum of the portions of $Nb_2O_5$ and $ZrO_2$ may be in a range of 12 to 24% by weight, of 14 to 22% by weight, or of 16 to 20% by weight. In particular, it is advantageous to limit the sum of the portions of $Nb_2O_5$ and $ZrO_2$ at the upper end, because higher portions of $ZrO_2$ which is a component which is particularly difficult to solve may be particularly problematic in connection with high portions of $Nb_2O_5$. Because $Nb_2O_5$ in particular crystallizes on interfacial areas, such as, for example, $ZrO_2$ crystal seeds. So, in the case of re-pressing, slumping or aftercooling also in the volume very large crystals may grow in an uncontrolled manner, and it is even possible that the cast product cracks. There is also the risk that during slumping and in the worst case also cooling a thick crystalline layer is formed which can only be removed without cracks with very high difficulties. The sum of the portions of $Nb_2O_5$ and $ZrO_2$ may, for example, be at least 12% by weight, at least 14% by weight, or at least 16% by weight. The sum of the portions of $Nb_2O_5$ and $ZrO_2$ may, for example, be at most 24% by weight, at most 22% by weight, or at most 20% by weight.

Thus, the glass compositions provided according to the present invention are based on a balance of most different, partially contrary effects. When the portions of non-coloring components are increased too strongly, then this may have a negative influence onto the stability of the glass. Also, in some embodiments, the portions of $TiO_2$ and $Nb_2O_5$ are very high, wherein also here it is necessary to be careful due to crystallization processes. $TiO_2$ is cheaper and has a more positive influence onto the refractive index, but with respect to the UV absorption it is disadvantageous. Therefore, this results in the following described sums and ratios which lead to advantageous glasses.

The weight ratio of the sum of the portions of $TiO_2$ and $ZrO_2$ to the sum of the portions of $Nb_2O_5$ and $ZrO_2$ may be in a range of 1.05:1 to 1.45:1, such as 1.10:1 to 1.40:1, 1.15:1 to 1.35:1, or 1.20:1 to 1.30:1. The weight ratio of the sum of the portions of $TiO_2$ and $ZrO_2$ to the sum of the portions of $Nb_2O_5$ and $ZrO_2$ may, for example, be at least 1.05:1, at least 1.10:1, at least 1.15:1, or at least 1.20:1. The weight ratio of the sum of the portions of $TiO_2$ and $ZrO_2$ to the sum of the portions of $Nb_2O_5$ and $ZrO_2$ may, for example, be at most 1.45:1, at most 1.40:1, at most 1.35:1, or at most 1.30:1.

In some embodiments, the sum of the weight portions of $Nb_2O_5$ and $ZrO_2$ is higher than the weight portion of $TiO_2$. In some embodiments, the weight ratio of the sum of the portions of $Nb_2O_5$ and $ZrO_2$ to the portion of $TiO_2$ is in a range of 1.05:1 to 1.25:1. In some embodiments, the weight ratio of the sum of the portions of $Nb_2O_5$ and $ZrO_2$ to the portion of $TiO_2$ is higher than 1.10:1, for example 1.11:1 to 1.20:1. The weight ratio of the sum of the portions of $Nb_2O_5$ and $ZrO_2$ to the portion of $TiO_2$ may, for example, be at least 1.05:1, higher than 1.10:1, or at least 1.11:1. The weight ratio of the sum of the portions of $Nb_2O_5$ and $ZrO_2$ to the portion of $TiO_2$ may, for example, be at most 1.25:1, or at most 1.20:1.

The sum of the portions of $La_2O_3$, $Nb_2O_5$ and $ZrO_2$ may be in a range of 55 to 75% by weight, such as of 57.5 to 72.5% by weight or of 60 to 70% by weight. In some embodiments, the sum of the portions of $La_2O_3$, $Nb_2O_5$ and $ZrO_2$ is at least 55% by weight, at least 57.5% by weight, at least 60% by weight, or even at least 62.0% by weight or at least 64.0% by weight. The sum of the portions of $La_2O_3$, $Nb_2O_5$ and $ZrO_2$ may, for example, be at most 75% by weight, at most 72.5% by weight, or at most 70% by weight.

In some embodiments, the weight ratio of the portion of $TiO_2$ to the portion of $ZrO_2$ is at most 3.00:1, such as at most 2.80:1, at most 2.65:1, at most 2.60:1, at most 2.55:1, at most 2.50:1, at most 2.45:1, or at most 2.40:1. In some embodiments, the weight ratio of the portion of $TiO_2$ to the portion of $ZrO_2$ is in a range of 1.10:1 to 3.00:1, such as of 1.30:1 to 2.80:1, of 1.50:1 to 2.65:1, of 1.70:1 to 2.60:1, of 1.80:1 to 2.55:1, of 1.90:1 to 2.50:1, 2.00:1 to 2.45:1 or 2.10:1 to 2.40:1. The weight ratio of the portion of $TiO_2$ to the portion of $ZrO_2$ may, for example, be at least 1.10:1, at least 1.30:1, at least 1.50:1, at least 1.70:1, at least 1.80:1, or at least 1.90:1, at least 2.00:1, at least 2.10:1, at least 2.20:1, or at least 2.30:1.

The glasses provided according to the present invention contain $Gd_2O_3$ in a portion of 4 to 11% by weight, such as 4.5 to 9% by weight, 4.75 to 8.5% by weight, or 5 to 8% by weight. Very high portions of $Gd_2O_3$ may negatively influence the stability of the glass. The portion of $Gd_2O_3$ may, for example, be at least 4% by weight, at least 4.5% by weight, at least 4.75% by weight, or at least 5% by weight. The portion of $Gd_2O_3$ may, for example, be at most 11% by weight, at most 10.5% by weight, at most 10% by weight, at most 9.5% by weight, at most 9% by weight, at most 8.5% by weight, at most 8% by weight, at most 7.5% by weight, at most 7% by weight, at most 6.5% by weight, or at most 6% by weight.

The glasses provided according to the present invention may contain $Y_2O_3$. In some embodiments, the portion of $Y_2O_3$ is in a range of 0 to 5% by weight, for example 0.1 to 2% by weight, 0.2 to 1% by weight or 0.4 to 0.8% by weight. Some embodiments are free of $Y_2O_3$. High portions of $Y_2O_3$ may have a negative influence onto the stability of the glass. Some embodiments contain at most 5% by weight, at most 2% by weight, at most 1% by weight, at most 0.8% by weight, at most 0.7% by weight, at most 0.6% by weight, at most 0.5% by weight, at most 0.2% by weight, or at most 0.1% by weight $Y_2O_3$.

The glasses provided according to the present invention may contain BaO. On the one hand, BaO can stabilize high portions of $TiO_2$, however, on the other hand, it may have a negative influence onto the refractive index. In some embodiments, the portion of BaO is in a range of 0 to 10% by weight, for example 1 to 8% by weight, 2 to 6% by weight or 3 to 5% by weight. Some embodiments are free of BaO. The portion of BaO may, for example, be at least 0.5% by weight, at least 1% by weight, more than 1.0% by weight, at least 1.1% by weight, at least 1.2% by weight, at least 1.3% by weight, at least 1.4% by weight, at least 1.5% by weight, at least 1.6% by weight, at least 1.7% by weight, at least 1.8% by weight, at least 1.9% by weight, at least 2% by weight, at least 2.1% by weight, at least 2.2% by weight, at least 2.3% by weight, at least 2.4% by weight, at least 2.5% by weight, at least 2.6% by weight, at least 2.7% by weight, at least 2.8% by weight, at least 2.9% by weight, or at least 3% by weight. The portion of BaO may, for example, be at most 10% by weight, at most 8% by weight, at most 7% by weight, at most 6% by weight, or at most 5% by weight.

The weight ratio of the portion of $TiO_2$ to the portion of BaO may, for example, be in a range of from 1.0:1 to 25:1, from 1.5:1 to 20:1, from 2.0:1 to 15:1, from 2.5:1 to 10:1, from 3.0:1 to 7.5:1, from 3.5:1 to 6.0:1, or from 4.0:1 to 5.0:1. The weight ratio of the portion of $TiO_2$ to the portion of BaO may, for example, be at least 1.0:1, at least 1.5:1, at least 2.0:1, at least 2.5:1, at least 3.0:1, at least 3.5:1, or at least 4.0:1. The weight ratio of the portion of $TiO_2$ to the portion of BaO may, for example, be at most 25:1, at most 20:1, at most 15:1, at most 10:1, at most 7.5:1, at most 6.0:1, or at most 5.0:1.

The glasses provided according to the present invention may contain $HfO_2$, in particular for increasing the refractive index. In some embodiments, the portion of $HfO_2$ is in a range of 0 to 1% by weight, for example 0.1 to 0.5% by weight or 0.15 to 0.25% by weight. Low portions of $HfO_2$ do normally not result in problems. Nevertheless, some embodiments are free of $HfO_2$. The portion of $HfO_2$ may, for example, be at most 1% by weight, at most 0.5% by weight, at most 0.25% by weight, at most 0.2% by weight, at most 0.15% by weight, or at most 0.1% by weight. The portion of $HfO_2$ may, for example, be at least 0.05% by weight, at least 0.10% by weight, or at least 0.15% by weight.

The glasses provided according to the present invention may contain alkali metal oxides, in particular $Li_2O$. However, in some embodiments, the glass is free of alkali metal oxides. In some embodiments, the portion of $Li_2O$ is in a range of 0 to 0.5% by weight, for example 0.05 to 0.2% by weight. $Li_2O$ is known for its corrosiveness with respect to ceramic tank and crucible materials, and therefore, when possible, it is not used or only used in low amounts. In some embodiments, the glass is free of $Li_2O$. The portion of $Li_2O$ may, for example, be at most 0.5% by weight, at most 0.2% by weight, or at most 0.1% by weight.

In one embodiment, the glass consists of at least 95.0% by weight, such as of at least 98.0% by weight or of at least 99.0% by weight of the components $SiO_2$, $B_2O_3$, $La_2O_3$, $Gd_2O_3$, $Nb_2O_5$, $TiO_2$ and $ZrO_2$, or of the components $SiO_2$, $B_2O_3$, $La_2O_3$, $Gd_2O_3$, $Nb_2O_5$, $TiO_2$, $ZrO_2$ and BaO. In some embodiments, the glass substantially completely consists of the components $SiO_2$, $B_2O_3$, $La_2O_3$, $Gd_2O_3$, $Nb_2O_5$, $TiO_2$, $ZrO_2$ and $HfO_2$, or of the components $SiO_2$, $B_2O_3$, $La_2O_3$, $Gd_2O_3$, $Nb_2O_5$, $TiO_2$, $ZrO_2$ and BaO.

In some embodiments, the glass provided according to the present invention is free of one or more constituents selected from MgO, CaO, SrO and ZnO. In some embodiments, the glass is free of MgO, CaO, SrO and ZnO. These components decrease the refractive power and destabilize the glass. The same applies to $Al_2O_3$. Therefore, in some embodiments, the glass is free of $Al_2O_3$.

In some embodiments, the glass is free of one or more of the constituents $WO_3$, $Ta_2O_5$ and/or $GeO_2$. In some embodiments, the glass is free of $WO_3$, $Ta_2O_5$ and $GeO_2$. When these constituents are present, then the batch costs considerably increase.

The melts of the glass can be refined with the classical refining agents. But, since the glasses can be melted in particular at temperatures of below 1300° C. and due to their low viscousness also a refining process at rather moderate temperatures is possible, for the benefit of the UV transmittance, the content of, e.g., $Sb_2O_3$, $As_2O_3$ and/or $SnO_2$ can be reduced (e.g., to <0.1% by weight), or they can be omitted (pure physical refining). $Sb_2O_3$, $As_2O_3$ and $SnO_2$ can be used as refining agents. They are used only in low amounts. In particular arsenic and antimony are controversial due to health hazards. The glass can be refined without chemical refining agents. Optionally, the glass may comprise one or more of the following components having refining effect in the given portions in % by weight:

| | |
|---|---|
| $Sb_2O_3$ | 0.0 to 0.5 |
| $As_2O_3$ | 0.0 to 0.5 |
| $SnO_2$ | 0.0 to 0.5 |

The refining with $SnO_2$ requires comparatively high temperatures. Therefore, in some embodiments, $SnO_2$ is omitted. In some embodiments, the glasses provided according to the present invention are free of $SnO_2$.

$Sb_2O_3$ has not proven to be very effective for refining, and the absorption of Sb in the glass may deteriorate the UV edge. Therefore, in some embodiments, $Sb_2O_3$ is omitted. In some embodiments, the glasses provided according to the present invention are free of $Sb_2O_3$.

In particular due to the health hazards, $As_2O_3$ can be omitted. In some embodiments, the glasses provided according to the present invention are free of $As_2O_3$.

In some embodiments, sulfate can be used as refining agent. However, sulfate raw materials often involve iron which may entail a deterioration of the transmittance. Therefore, in some embodiments, sulfate raw materials are omitted. In some embodiments, the glasses provided according to the present invention are free of sulfate.

In addition, neither $As_2O_3$ nor sulfate help against $N_2$ bubbles. When $N_2$ bubbles occur, then, for avoiding them, it is possible to use, for example, an atmosphere of protective gas, such as $CO_2$ or argon, for keeping $N_2$ off the melt surface.

The glasses provided according to the present invention may be free of absorbing components, in particular free of components with absorption in the visible range. In some embodiments, the glasses provided according to the present invention are free of $Fe_2O_3$.

In some embodiments, the glass is free of phosphate ($P_2O_5$), because in a considerable extent it makes the melt to a reducing one, and thus it considerably increases the oxygen demand of the melt.

In some embodiments, the glass is substantially free of one or more, for example of all, constituents selected from lead, bismuth, cadmium, nickel, platinum, arsenic and antimony.

When in this description is mentioned that the glass is free of a component or that it does not contain a certain component, then this means that for this component at the most it is allowed to be present as an impurity in the glass. This means that it is not added in substantial amounts. According to the present invention, not substantial amounts are amounts of less than 200 ppm, such as less than 100 ppm, less than 50 ppm or less than 10 ppm (m/m).

In some embodiments, the portion of platinum is exceptionally low, because platinum notably decreases the transmittance of the glass. In some embodiments, the portion of platinum is lower than 5 ppm, such as lower than 3 ppm, lower than 1 ppm, lower than 50 ppb, or lower than 20 ppb (m/m).

In some exemplary embodiments provided according to the present invention, a glass article comprises the described glass or consists thereof. The glass article may have different forms. Optionally, the article has the form of
- a glass for eyeglasses, such as a stack of wafers,
- a wafer, in particular with a maximum diameter of 5.0 cm to 40.0 cm,
- a lens, such as a spherical lens, a prism or an asphere, and/or
- a light wave guide, such as a fiber or plate.

In some exemplary embodiments, the invention relates to the use of a glass or glass article described here in AR eyeglasses, wafer level optics, optical wafer applications, or the classical optics. In an alternative or in addition, the glass described here or the glass article described here can be used as wafer, lens, spherical lens or light wave guide.

In some exemplary embodiments provided according to the present invention, a method is provided for the production of a glass or glass article according to the present invention. The method comprises the following steps:
- melting of the glass raw materials,
- optionally forming of a glass article from the glass melt,
- cooling of the glass.

Due to the glass composition provided according to the present invention, the melting of the glass raw materials can be conducted at relatively low meltdown temperatures. Relatively low meltdown temperatures are advantageous, because with them the oxygen content of the batch is not reduced too strong, which otherwise may result in brown coloration by niobium or stronger yellow coloration by reduced titanium. In some embodiments, the melting of the glass raw materials is conducted at meltdown temperatures which are lower than 1400° C., such as lower than 1350° C. or lower than 1300° C.

The production method provided according to the present invention may also comprise a refining step. In some embodiments, also the refining temperatures are relatively low, such as lower than 1550° C., lower than 1450° C., or lower than 1400° C. A purely physical refining process may be used, thus without the addition of refining agents.

In some embodiments, bubbling of $O_2$ and passing over of $O_2$ are omitted. Due to the exemplary low process temperatures, also without addition of $O_2$ the melt retains enough $O_2$ for maintaining the highest oxidation states of, e.g., Nb(V) or Ti(IV) which are required for the UV edge, without additional Pt getting into the glass.

The cooling of the glass may be conducted with a cooling rate in a range of 1 K/h to 20 K/h, such as 1.15 K/h to 15 K/h or 1.3 K/h to 10 K/h. Low cooling rates may be advantageous for reducing or avoiding stresses. The cooling of the glass may, for example, be conducted with a cooling rate of at least 1 K/h, at least 1.15 K/h, or at least 1.3 K/h. The cooling of the glass may, for example, be conducted with a cooling rate of at most 20 K/h, at most 15 K/h, or at most 10 K/h.

Examples

The example compositions shown in the following tables in % by weight were melted, and their properties were examined. The cooling of the glass was conducted with a cooling rate of 10 K/h.

TABLE 1

|  | 1 | 2 | 3 | 4 | 5 | 6 | 7 | 8 | 9 |
| --- | --- | --- | --- | --- | --- | --- | --- | --- | --- |
| $SiO_2$ | 6.8 | 6.9 | 6.1 | 5.1 | 5.0 | 4.5 | 4.9 | 7.9 | 6.9 |
| $B_2O_3$ | 7.7 | 7.6 | 6.1 | 6.0 | 5.9 | 5.1 | 6.0 | 6.9 | 6.0 |
| $La_2O_3$ | 45.1 | 45.2 | 46.0 | 46.2 | 44.2 | 45.7 | 45.2 | 44.6 | 45.0 |
| $Gd_2O_3$ | 9.6 | 9.8 | 8.1 | 7.9 | 8.9 | 7.9 | 7.7 | 9.6 | 7.7 |
| $Nb_2O_5$ | 10.2 | 8.8 | 9.5 | 10.8 | 12.2 | 12.1 | 9.6 | 10.1 | 10.5 |
| $Y_2O_3$ | 0.6 | 0.6 | 0.6 | 0.6 | 0.6 | 0.6 | 0.6 | 0.6 | 0.6 |
| $TiO_2$ | 11.6 | 11.8 | 14.2 | 15.5 | 14.4 | 15.3 | 18.2 | 12.7 | 15.6 |
| $ZrO_2$ | 8.1 | 8.9 | 9.2 | 7.6 | 8.5 | 8.4 | 7.4 | 7.4 | 7.4 |
| $Sb_2O_3$ | 0.08 | 0.09 | 0.08 | 0.08 | 0.08 | 0.08 | 0.04 | 0.04 | 0.04 |
| $HfO_2$ | 0.2 | 0.2 | 0.2 | 0.2 | 0.2 | 0.2 | 0.2 | 0.2 | 0.2 |
| $\Sigma$ ($La_2O_3$ + $Nb_2O_5$ + $TiO_2$ + $ZrO_2$) | 75.0 | 74.7 | 78.8 | 80.1 | 79.3 | 81.6 | 80.5 | 74.8 | 78.6 |
| $\Sigma$ ($La_2O_3$ + $Nb_2O_5$ + $ZrO_2$)/ $TiO_2$ | 5.5 | 5.3 | 4.6 | 4.2 | 4.5 | 4.3 | 3.4 | 4.9 | 4.0 |

TABLE 1-continued

|  | 1 | 2 | 3 | 4 | 5 | 6 | 7 | 8 | 9 |
|---|---|---|---|---|---|---|---|---|---|
| Properties | | | | | | | | | |
| Density [g/cm$^3$] | 5.11 | 5.12 | 5.18 | 5.21 | 5.23 | 5.30 | 5.17 | 5.08 | 5.11 |
| nd | 1.9996 | 1.9975 | 2.0349 | 2.0550 | 2.0557 | 2.0760 | 2.0682 | 2.0023 | 2.0382 |
| nF | 1.9897 | 1.9877 | 2.0241 | 2.0436 | 2.0444 | 2.0660 | 2.0562 | 1.9922 | 2.0271 |
| nC | 1.9843 | 1.9823 | 2.0182 | 2.0374 | 2.0382 |  | 2.0497 | 1.9867 | 2.0210 |
| νd | 29.3 | 29.5 | 27.7 | 26.7 | 26.8 | 26.0 | 25.7 | 28.7 | 26.9 |
| Tg [° C.] | 730 | 730 | 743 | 743 | 738 | 754 | 747 | 735 | 741 |
| TI(10 mm) 420 nm | | | | | | | 0.24 | 0.44 | 0.33 |
| TI(10 mm) 460 nm | | | | | | | 0.62 | 0.74 | 0.68 |

TABLE 2

|  | 10 | 11 | 12 | 13 | 14 | 15 | 16 | 17 |
|---|---|---|---|---|---|---|---|---|
| SiO$_2$ | 6.9 | 6.7 | 4.0 | 6.0 | 6.5 | 4.1 | 5.1 | 6.9 |
| B$_2$O$_3$ | 6.0 | 6.1 | 7.0 | 7.6 | 7.0 | 7.0 | 6.0 | 5.6 |
| La$_2$O$_3$ | 45.3 | 44.3 | 45.9 | 45.5 | 44.8 | 46.7 | 47.0 | 46.0 |
| Gd$_2$O$_3$ | 8.8 | 7.6 | 7.9 | 9.7 | 9.6 | 8.0 | 7.9 | 7.7 |
| Nb$_2$O$_5$ | 9.2 | 10.3 | 10.7 | 8.8 | 10.7 | 10.3 | 10.7 | 9.6 |
| Y$_2$O$_3$ | 0.6 | 0.6 | 0.6 | 0.6 | 0.6 | 0.6 | 0.6 | 0.6 |
| TiO$_2$ | 15.2 | 16.8 | 15.5 | 14.0 | 13.2 | 15.6 | 15.4 | 16.1 |
| ZrO$_2$ | 7.9 | 7.3 | 8.0 | 7.6 | 7.5 | 7.6 | 7.0 | 7.4 |
| Li$_2$O |  |  | 0.1 |  |  |  |  |  |
| Sb$_2$O$_3$ | 0.04 | 0.04 |  |  |  |  |  |  |
| HfO$_2$ | 0.2 | 0.2 | 0.2 | 0.2 | 0.2 | 0.2 | 0.2 | 0.2 |
| Σ (La$_2$O$_3$ + Nb$_2$O$_5$ + TiO$_2$ + ZrO$_2$) | 77.5 | 78.7 | 80.2 | 75.9 | 76.1 | 80.2 | 80.2 | 79.0 |
| Σ (La$_2$O$_3$ + Nb$_2$O$_5$ + ZrO$_2$)/ TiO$_2$ | 4.1 | 3.7 | 4.2 | 4.4 | 4.8 | 4.1 | 4.2 | 3.9 |
| Properties | | | | | | | | |
| Density [g/cm$^3$] | 5.14 | 5.10 | 5.20 | 5.11 | 5.11 | 5.19 | 5.22 | 5.12 |
| nd | 2.0323 | 2.0462 | 2.0547 | 2.0122 | 2.0151 | 2.0490 | 2.0537 | 2.0378 |
| nF | 2.0214 | 2.0348 | 2.0433 | 2.0019 | 2.0047 | 2.0377 | 2.0423 | 2.0267 |
| nC | 2.0155 | 2.0285 | 2.0371 | 1.9963 | 1.9990 | 2.0316 | 2.0362 | 2.0207 |
| νd | 27.4 | 26.3 | 26.7 | 28.4 | 28.2 | 26.9 | 26.8 | 27.0 |
| Tg [° C.] | 746 | 742 | 724 | 728 | 730 | 731 | 747 | 744 |
| TI(10 mm) 420 nm | 0.36 | 0.26 | 0.46 | 0.57 | 0.73 | 0.71 | 0.78 | 0.73 |
| TI(10 mm) 460 nm | 0.69 | 0.63 | 0.74 | 0.80 | 0.87 | 0.84 | 0.91 | 0.87 |

TABLE 3

|  | 18 | 19 | 20 | 21 | 22 | 23 | 24 | 25 | 26 |
|---|---|---|---|---|---|---|---|---|---|
| SiO$_2$ | 6.7 | 5.2 | 5.0 | 5.0 | 5.0 | 5.0 | 5.0 | 5.0 | 5.5 |
| B$_2$O$_3$ | 5.9 | 6.2 | 6.0 | 5.9 | 6.0 | 6.5 | 7.0 | 6.5 | 5.5 |
| La$_2$O$_3$ | 46.5 | 46.6 | 47.0 | 47.1 | 47.0 | 47.0 | 43.0 | 47.0 | 47.0 |
| Gd$_2$O$_3$ | 7.7 | 7.7 | 8.0 | 7.9 | 6.0 | 5.0 | 4.0 | 5.0 | 5.0 |
| Nb$_2$O$_5$ | 10.5 | 9.7 | 11.0 | 10.7 | 13.0 | 11.0 | 11.0 | 11.0 | 11.5 |
| Y$_2$O$_3$ | 0.6 | 0.6 | 0.6 | 0.6 | 0.6 |  |  |  |  |

TABLE 3-continued

| | 18 | 19 | 20 | 21 | 22 | 23 | 24 | 25 | 26 |
|---|---|---|---|---|---|---|---|---|---|
| $TiO_2$ | 15.1 | 16.3 | 15.0 | 15.4 | 15.5 | 15.0 | 15.0 | 15.5 | 16.0 |
| $ZrO_2$ | 6.9 | 7.5 | 7.5 | 7.1 | 7.0 | 6.5 | 3.0 | 6.5 | 6.5 |
| BaO | | | | | | 4.0 | 12.0 | 4.0 | 3.5 |
| $Sb_2O_3$ | | | | | | | | | |
| $HfO_2$ | 0.2 | 0.2 | | 0.2 | | | | | |
| $\Sigma$ ($La_2O_3$ + $Nb_2O_5$ + $TiO_2$ + $ZrO_2$) | 79.0 | 80.1 | 80.5 | 80.3 | 82.5 | 79.5 | 72.0 | 80.0 | 81.0 |
| $\Sigma$ ($La_2O_3$ + $Nb_2O_5$ + $ZrO_2$)/ $TiO_2$ | 4.2 | 3.9 | 4.4 | 4.2 | 4.3 | 4.3 | 3.8 | 4.2 | 4.1 |
| Properties | | | | | | | | | |
| Density [g/cm³] | 5.13 | 5.19 | | 5.23 | 5.18 | 5.15 | 5.06 | 5.12 | |
| nd | 2.0361 | 2.0548 | | | 2.0616 | 2.0352 | 2.0024 | 2.0367 | |
| nF | 2.0632 | 2.0830 | | | 2.0906 | 2.0625 | 2.0284 | 2.0642 | |
| nC | 2.0251 | 2.0434 | | | 2.0499 | 2.0242 | 1.9919 | 2.0256 | |
| vd | 27.2 | 26.6 | | | 26.1 | 27.0 | 27.5 | 26.8 | |
| Tg [° C.] | 740 | 746 | | 739 | 739 | 740 | 724 | 727 | |
| TI(10 mm) 420 nm | 0.83 | 0.80 | | 0.78 | 0.75 | 0.81 | 0.76 | 0.76 | |
| TI(10 mm) 460 nm | 0.92 | 0.91 | | 0.90 | 0.89 | 0.91 | 0.86 | 0.89 | |

Table 1 shows the example glasses 3 to 6 and 9 provided according to the present invention as well as the comparative examples 1, 2, 7 and 8 which are not provided according to the present invention. In the case of the comparative examples 1, 2 and 8 the sum of the portions of the components $La_2O_3$, $Nb_2O_5$, $TiO_2$ and $ZrO_2$ is low. These comparative examples have a low refractive index. In the case of the comparative example 7, the weight ratio of the sum of the portions of $ZrO_2$, $La_2O_3$ and $Nb_2O_5$ to the portion of $TiO_2$ is low. The comparative example 7 has a relatively low internal transmission at 420 nm and 460 nm.

Table 2 shows the example glasses 10 and 12 as well as 15 to 17 provided according to the present invention. The glasses 13 and 14 are comparative examples which are not provided according to the present invention, with a low sum of the portions of the components $La_2O_3$, $Nb_2O_5$, $TiO_2$ and $ZrO_2$ and low refractive index. In the case of the comparative example 11, the weight ratio of the sum of the portions of $ZrO_2$, $La_2O_3$ and $Nb_2O_5$ to the portion of $TiO_2$ is low.

Table 3 shows the example glasses 18 to 23 as well as 25 and 26 provided according to the present invention. The glass 24 is a comparative example which is not provided according to the present invention, with a low sum of the portions of the components $La_2O_3$, $Nb_2O_5$, $TiO_2$ and $ZrO_2$ and low refractive index. In the case of the comparative example 24, also the weight ratio of the sum of the portions of $ZrO_2$, $La_2O_3$ and $Nb_2O_5$ to the portion of $TiO_2$ is low.

The glass transition temperature $T_g$ of the glasses shown in the Tables 1 to 3 was in a range of 724° C. to 754° c.

Further characteristic glass properties are shown in the following Table 4 exemplarily by the above-described glasses 7 to 9 and 11.

TABLE 4

| | 7 | 8 | 9 | 11 |
|---|---|---|---|---|
| CTE(20,300) [ppm/K] | 8.5 | 8.1 | 8.3 | 8.2 |
| T1 [° C.] | 1173 | 1173 | 1184 | 1180 |
| T4 [° C.] | 954 | 923 | 960 | 950 |
| T7.6 [° C.] | 834 | 811 | 836 | 833 |
| TK [° C.] | 1140 | 1060 | 1110 | 1135 |
| Viscosity at TK [dPas] | ~$10^1$ | ~$10^{1.9}$ | ~$10^{15}$ | ~$10^{1.1}$ |

Further example glass compositions (in % by weight) and properties are shown in Table 5.

TABLE 5

| | 27 | 28 | 29 | 30 |
|---|---|---|---|---|
| $SiO_2$ | 5.5 | 5.4 | 5.4 | 5.4 |
| $B_2O_3$ | 5.5 | 5.3 | 5.4 | 5.1 |
| $La_2O_3$ | 46.8 | 46.7 | 46.7 | 46.9 |
| $Gd_2O_3$ | 5.0 | 5.1 | 5.1 | 5.0 |
| $Nb_2O_5$ | 11.4 | 11.4 | 11.4 | 11.1 |
| $TiO_2$ | 15.9 | 16.1 | 16.1 | 16.5 |
| $ZrO_2$ | 6.5 | 6.5 | 6.4 | 6.1 |
| BaO | 3.5 | 3.6 | 3.6 | 3.6 |
| $HfO_2$ | | | | 0.2 |
| $\Sigma$ ($La_2O_3$ + $Nb_2O_5$ + $TiO_2$ + $ZrO_2$) | 80.6 | 80.7 | 80.6 | 80.6 |
| $\Sigma$ ($La_2O_3$ + $Nb_2O_5$ + $ZrO_2$)/ $TiO_2$ | 4.1 | 4.0 | 4.0 | 3.9 |
| Properties | | | | |
| Density [g/cm³] | 5.16 | 5.18 | 5.17 | 5.18 |
| nd | 2.0491 | 2.0519 | 2.0509 | 2.0555 |
| nF | 2.0774 | 2.0804 | 2.0794 | 2.0842 |
| nC | 2.0376 | 2.0404 | 2.0394 | 2.0440 |
| vd | 26.4 | 26.3 | 26.3 | 26.2 |
| Tg [° C.] | 749 | 746 | 748 | 749 |
| TI(10 mm) 420 nm | | | | 0.71 |
| TI(10 mm) 460 nm | | | | 0.87 |

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass, comprising the following components in % by weight:

| Component | Proportion (% by weight) |
|---|---|
| $SiO_2$ | 2-10 |
| $B_2O_3$ | 2-10 |
| $La_2O_3$ | 40-55 |
| $Gd_2O_3$ | 4-11 |
| $Nb_2O_5$ | 6-14 |
| $TiO_2$ | 8-18.5 |
| $ZrO_2$ | 5-11; | wherein the glass has a refractive index $n_d$ of at least 2.02, a sum of the proportions of $La_2O_3$, $Nb_2O_5$, $TiO_2$ and $ZrO_2$ is at least 76.5% by weight, and a weight ratio of a sum of the proportions of $La_2O_3$, $Nb_2O_5$ and $ZrO_2$ to the proportion of $TiO_2$ is at least 3.85:1.

2. The glass of claim 1, wherein at least one of the following is satisfied:
a proportion of $Y_2O_3$ is 0 to 5% by weight;
a proportion of BaO is 0 to 10% by weight; or
a proportion of $HfO_2$ is 0 to 1% by weight.

3. The glass of claim 1, wherein a proportion of $Sb_2O_3$ is at most 50 ppm.

4. The glass of claim 1, wherein the proportion of BaO is in a range of from 1 to 8% by weight.

5. The glass of claim 1, wherein the proportion of $Gd_2O_3$ is at most 9% by weight and the proportion of $ZrO_2$ is at least 6% by weight.

6. The glass of claim 1, wherein the proportion of $Gd_2O_3$ is in a range of from 4.5 to 9% by weight and the proportion of $ZrO_2$ is in a range of from 6 to 11% by weight.

7. The glass of claim 1, wherein a sum of the proportions of $La_2O_3$, $Nb_2O_5$ and $ZrO_2$ is in a range of 55 to 75% by weight.

8. The glass of claim 1, wherein a weight ratio of a sum of the proportions of $La_2O_3$ and $Nb_2O_5$ to a sum of the proportions of $TiO_2$ and $ZrO_2$ is at least 2.25:1.

9. The glass of claim 1, wherein a sum of the weight proportions of $Nb_2O_5$ and $ZrO_2$ is higher than the weight proportion of $TiO_2$.

10. The glass of claim 1, wherein a weight ratio of a sum of the proportions of $La_2O_3$ and $Nb_2O_5$ to the proportion of $TiO_2$ is at least 3.15:1.

11. The glass of claim 1, wherein a weight ratio of the proportion of $TiO_2$ to the proportion of $ZrO_2$ is at most 3.00:1.

12. The glass of claim 1, wherein the glass has an internal transmission TI of at least 80%, measured at a wavelength of 460 nm and a sample thickness of 10 mm.

13. A glass having a refractive index $n_d$ of at least 2.02 and an internal transmission TI of at least 85%, measured at a wavelength of 460 nm and a sample thickness of 10 mm, wherein the glass comprises the following components in % by weight:

| Component | Proportion (% by weight) |
|---|---|
| $SiO_2 + B_2O_3$ | 6-16 |
| $La_2O_3$ | 40-55 |
| $Gd_2O_3$ | 4-11 |
| $Nb_2O_5$ | 6-14 |
| $TiO_2$ | 8-18.5 |
| $ZrO_2$ | 5-11; | wherein a sum of the proportions of $La_2O_3$, $Nb_2O_5$, $TiO_2$ and $ZrO_2$ is at least 77% by weight and a weight ratio of a sum of the proportions of $La_2O_3$, $Nb_2O_5$ and $ZrO_2$ to the proportion of $TiO_2$ is at least 3.85:1, and wherein a weight ratio of the proportion of $SiO_2$ to the proportion of $B_2O_3$ is at least 0.65:1.

14. The glass of claim 13, wherein the glass comprises the following components in % by weight:

| Component | Portion (% by weight) |
|---|---|
| $SiO_2$ | 2-10 |
| $B_2O_3$ | 2-10 |
| $La_2O_3$ | 40-55 |
| $Gd_2O_3$ | 4-11 |
| $Nb_2O_5$ | 6-14 |
| $TiO_2$ | 8-18.5 |
| $ZrO_2$ | 5-11; |

15. The glass of claim 13, wherein the glass comprises BaO and a proportion of BaO is at least 2% by weight and at most 10% by weight.

16. The glass of claim 13, wherein a weight ratio of a proportion of $SiO_2$ to a proportion of $B_2O_3$ is at least 1:1.

17. The glass of claim 13, wherein a weight ratio of a sum of the proportions of $La_2O_3$, $Nb_2O_5$, $TiO_2$ and $ZrO_2$ to a sum of the proportions of $SiO_2$ and $B_2O_3$ is at least 7.15:1.

18. The glass of claim 13, wherein a weight ratio of a proportion of $TiO_2$ to a proportion of BaO is in a range of from 1.0:1 to 25:1.

19. The glass of claim 13, wherein the refractive index $n_d$ is at least 2.03.

20. A glass article, comprising:
a glass having a refractive index $n_d$ of at least 2.02 and being in the form of at least one of:
a glass for eyeglasses;
a stack of wafers;
a wafer;
a wafer with a maximum diameter of 5.0 cm to 40.0 cm;
a lens;
a spherical lens;
a prism;
an asphere;
a light wave guide;
a fiber; or
a plate;
wherein the glass has an internal transmission TI of at least 85%, measured at a wavelength of 460 nm and a sample thickness of 10 mm, and wherein the glass comprises the following components in % by weight:

| Component | Proportion (% by weight) |
|---|---|
| $SiO_2$ | 2-10 |
| $B_2O_3$ | 2-10 |
| $La_2O_3$ | 40-55 |
| $Gd_2O_3$ | 4-11 |
| $Nb_2O_5$ | 6-14 |
| $TiO_2$ | 8-18.5 |
| $ZrO_2$ | 5-11; | wherein a sum of the proportions of $La_2O_3$, $Nb_2O_5$, $TiO_2$ and $ZrO_2$ is at least 76.5% by weight, and a weight ratio of a sum of the proportions of $La_2O_3$, $Nb_2O_5$ and $ZrO_2$ to the proportion of $TiO_2$ is at least 3.85:1.

* * * * *